United States Patent [19]

Cale

[11] 4,196,642

[45] Apr. 8, 1980

[54] RAILWAY CAR BRAKE-ROD JAW

[75] Inventor: Roland E. Cale, Cortland, Ohio

[73] Assignee: Schaefer Equipment, Inc., Warren, Ohio

[21] Appl. No.: 961,499

[22] Filed: Nov. 17, 1978

[51] Int. Cl.[2] .......................... G05G 1/04; B23P 13/00; F16C 11/06

[52] U.S. Cl. .................................... 74/519; 29/175 A; 74/579 R; 403/157

[58] Field of Search .................. 74/519, 579; 403/157, 403/79; 174/207; 59/86, 87, 88; 29/175 R, 175 A

[56] References Cited

U.S. PATENT DOCUMENTS

| | | | |
|---|---|---|---|
| 607,596 | 7/1898 | Baker | 403/157 |
| 740,865 | 10/1903 | Jenkins | 403/157 |
| 1,210,708 | 1/1917 | Schwentler | 74/579 |
| 1,574,207 | 2/1926 | Schaefer | 74/519 |
| 1,608,536 | 11/1926 | Scully | 403/157 |
| 1,709,110 | 4/1929 | Bessonett | 29/175 A |
| 1,980,143 | 11/1934 | Peters et al. | 74/519 |
| 2,588,148 | 3/1952 | Morris | 74/519 X |
| 3,460,582 | 8/1969 | Hindle | 74/519 X |

FOREIGN PATENT DOCUMENTS

| | | | |
|---|---|---|---|
| 490005 | 1/1954 | Italy | 74/519 |

*Primary Examiner*—Leslie Braun
*Attorney, Agent, or Firm*—Brown, Flick & Peckham

[57] ABSTRACT

Metal stock is forged into a blank consisting of a rod-like shank joined at one end to the inner ends of a pair of forks having enlarged flattened outer ends projecting laterally of the forks in the same direction and provided with pin-receiving openings. One fork is aligned with the shank and the other fork extends laterally away from the shank and then outwardly, with its enlarged end projecting toward the other fork. Both forks are then twisted in the same direction to turn their flattened ends approximately 45° into spaced parallel planes, and the longer fork is bent to move its flattened end into a position in which its opening is axially aligned with the opening in the other enlarged end.

2 Claims, 7 Drawing Figures

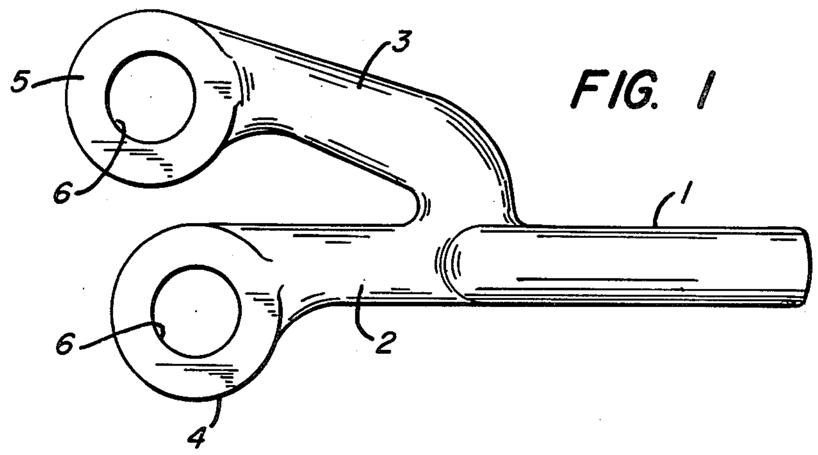
FIG. 1
FIG. 2
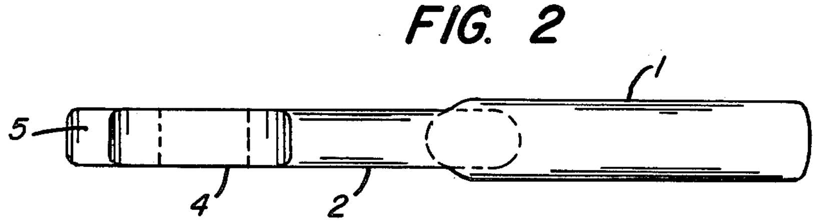
FIG. 3
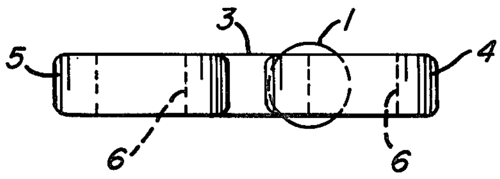

RAILWAY CAR BRAKE-ROD JAW

Brake-rods are used for connecting brake cylinders to the live levers of brake rigging. The rods in many cases extend across the top of the truck axles nearest the live levers. In such cases the upper ends of the inclined live levers are pivotally mounted in jaws, with which the brake rods are provided. There used to be considerable clearance between the axles and the overlying car bodies, but the newer and larger cars that use larger diameter wheels than heretofore have much less clearance between the car bodies and the axles, especially when the cars are loaded and the springs are depressed. This leaves little room for brake rods to extend over the axles, especially since brake-rod jaws must be tilted laterally at an angle around 45° to accommodate the inclined brake levers. This tilting of a brake-rod jaw elevates one of its forks, which should not be interfered with by the overlying car body.

It is an object of this invention to provide a brake-rod jaw that will require a minimum of clearance between a car axle and the car body above it. Other objects are to provide a simple method of making such jaws, in which deep forging die cavities are not required, and in which the jaw is formed by twisting and bending a flat forged blank.

The preferred embodiment of the invention is illustrated in the accompanying drawings, in which FIG. 1 is a plan view of a forged blank;

FIG. 2 is a side view thereof;

FIG. 3 is a view of the open end;

Figure 4:
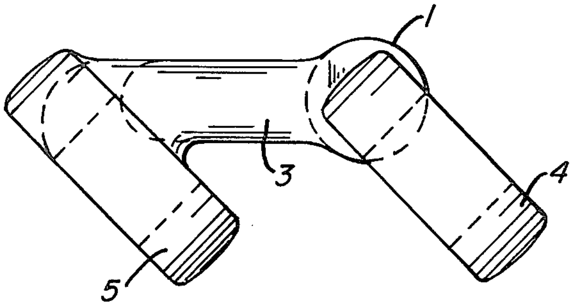
FIG. 4 is an end view of the blank after twisting.

Referring to FIGS. 1 to 3 of the drawings, metal stock, such as a bar, is forged between forging dies (not shown) to form a blank. The blank consists of a straight rod-like shank 1 that is integrally joined at one end to the inner ends of a pair of forks. One fork 2 is in alignment with the shank, while the other fork 3 extends laterally away from the shank a short distance and then outwardly beside the first fork and a short distance beyond it. The outer ends 4 and 5 of these forks are enlarged and flat and project laterally in the same direction from one side of the forks. The enlarged end of the longer fork projects toward the enlarged end of the other fork. These ends are enlarged for the purpose of accommodating pin-receiving openings 6 in them, which are formed during the forging operation. The shorter fork is the same width as the shank, but preferably it is flattened to reduce its thickness to the same thickness as its enlarged end, as shown in FIG. 3. The other fork is as wide or even wider at its inner end than the shank, and it also is flattened for a purpose to be described later. It will be seen that the forging of this blank requires only relatively shallow die cavities.

The next step in the method, illustrated in FIG. 4, is to twist both forks in the same direction in order to turn their enlarged ends 4 and 5 into laterally spaced parallel planes inclined to the laterally extending portion of the longer fork 3. Preferably, the angle of inclination is approximately 45°. If it is assumed that the blank was forged flat as shown, the enlarged ends of the forks are turned 45° during this twisting operation. The reason for choosing 45° will be explained later.

Figure 5:
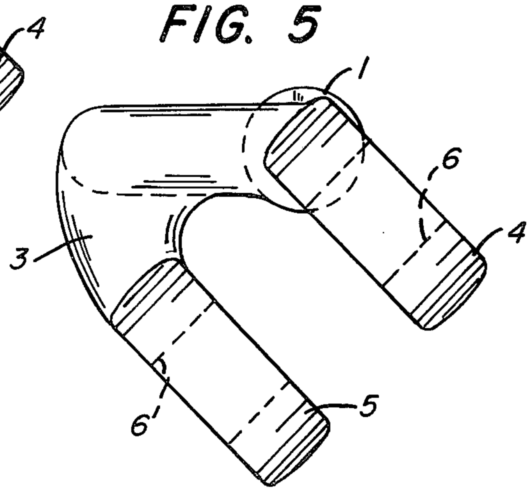
FIG. 5 is an end view of the finished jaw.
Figure 6:
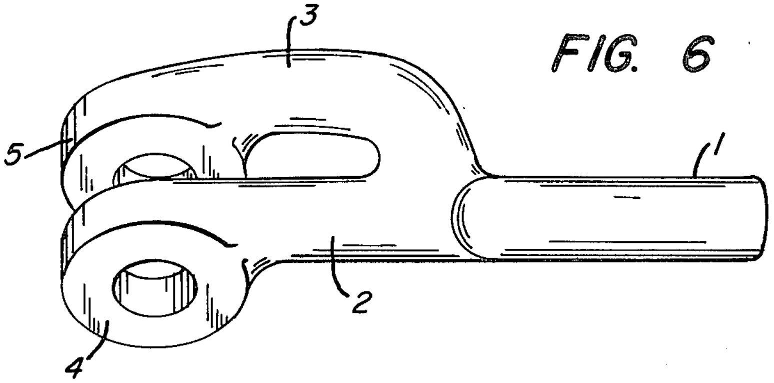
FIG. 6 is a plan view.
Figure 7:
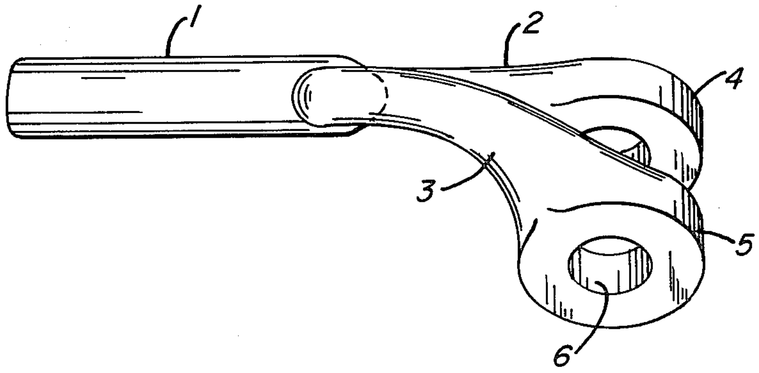
FIG. 7 is a view of the left-hand side of the jaw as seen in FIG. 5.

The portion of the longer fork extending along the other fork then is bent down to swing its enlarged end 5 into a position in which the pin-receiving opening in that end is axially aligned with the opening in the other enlarged end 4, as shown in FIG. 5, so that a pivot pin can be inserted in the two openings. Following this final positioning of the forks, it usually is advisable to ream the pin-receiving openings to smooth their walls and to make sure that a pivot pin can be inserted.

The finished jaw is now ready to have the outer end of the shank butt welded to one end of a brake rod. Thereafter, when the brake rod is installed in railway car brake rigging, the other end of the rod is suitably connected with a brake cylinder for moving the rod lengthwise. The jaw just described extends across the top of a car axle, with the jaw shank close to the axle and the outer ends of the forks extending down beside the axle. The brake rod is so positioned that the laterally extending inner end portion of the longer fork 3 will extend substantially parallel to the axle. Consequently, it requires but very little clearance between the axle and the car body above it to accommodate the brake rod jaw.

The reason that the enlarged ends of the two forks are inclined above 45° is that the brake lever, to which the jaw is attached, generally will be inclined between 41° and 49°. Therefore, if the lever is inclined a few degrees more or less than 45°, it requires the brake rod to be turned only a few degrees in one direction or the other to locate the enlarged ends of the jaw forks parallel to the lever so that the pivot pin can be inserted. If the rod is turned in a direction that swings the laterally extending portion of the longer fork upwardly, it still will not extend a material distance above the level of the jaw shank. However, by flattening that portion of the fork as previously described, and thereby reducing its thickness, the laterally extending portion still will not extend above the level of the shank in case the rod is turned 4°. In such a case, the forks can properly straddle the upper end of a brake lever inclined 49° instead of 45°.

Of course, it will be realized that by turning the enlarged ends of the forks in the opposite direction from that shown in FIGS. 4 and 5, the jaw can be positioned for connection to a brake lever inclined in the opposite direction from what is shown.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A railway car brake-rod jaw forging comprising a metal rod-like shank, a pair of forks having inner ends integral with one end of said shank, the outer end of each fork being enlarged and flattened and provided with a pin-receiving opening therethrough, one of said forks being substantially in axial alignment with said shank, the other fork being longer than said one fork and extending laterally away from the shank when the shank is horizontal and then outwardly beside said one fork and downwardly to locate its enlarged end beside the other enlarged end but at a lower level, said enlarged ends being parallel to each other in laterally spaced parallel planes inclined to the laterally extending portion of said other fork at approximately a 45° angle and with said pin-receiving openings in axial alignment.

2. A railway car brake-rod jaw according to claim 1, in which the laterally extending portion of said other fork has less thickness than said shank.

* * * * *